US012650515B2

(12) United States Patent
Scolari et al.

(10) Patent No.: US 12,650,515 B2
(45) Date of Patent: Jun. 9, 2026

(54) HAND-HELD OBSERVATION DEVICE AND METHOD FOR OBTAINING A 3D POINT CLOUD

(71) Applicant: SAFRAN VECTRONIX AG, Heerbrugg (CH)

(72) Inventors: Franck Scolari, Heerbrugg (CH); Holger Kirschner, Heerbrugg (CH); Jakub Olexa, Heerbrugg (CH); Stefan Günther, Heerbrugg (CH)

(73) Assignee: SAFRAN VECTRONIX AG, Heerbrugg (CH)

( * ) Notice: Subject to any disclaimer, the term of this patent is extended or adjusted under 35 U.S.C. 154(b) by 27 days.

(21) Appl. No.: 18/685,131

(22) PCT Filed: Aug. 10, 2022

(86) PCT No.: PCT/EP2022/072468
§ 371 (c)(1),
(2) Date: Feb. 20, 2024

(87) PCT Pub. No.: WO2023/030846
PCT Pub. Date: Mar. 9, 2023

(65) Prior Publication Data
US 2024/0361463 A1    Oct. 31, 2024

(30) Foreign Application Priority Data
Aug. 31, 2021    (EP) ..................................... 21194058

(51) Int. Cl.
*G01S 17/894*    (2020.01)
*G01C 3/04*    (2006.01)
(Continued)

(52) U.S. Cl.
CPC .............. *G01S 17/894* (2020.01); *G01C 3/04* (2013.01); *G01C 15/002* (2013.01); *G01S 7/51* (2013.01); *G01S 17/50* (2013.01); *G01S 17/86* (2020.01)

(58) Field of Classification Search
CPC .... G01S 117/50; G01S 117/86; G01S 117/89; G01S 117/894; G01S 7/51; G01C 3/04; G01C 15/002; G02B 23/105
See application file for complete search history.

(56) References Cited

U.S. PATENT DOCUMENTS

| | | | |
|---|---|---|---|
| 5,859,693 A | 1/1999 | Dunne et al. | |
| 9,285,481 B2 | 3/2016 | Jasiobedzki et al. | |

(Continued)

FOREIGN PATENT DOCUMENTS

| | | | |
|---|---|---|---|
| DE | 19836812 A1 | 2/2000 | |
| DE | 10253669 A1 | 6/2004 | |

(Continued)

OTHER PUBLICATIONS

International Application No. PCT/EP2022/072468, International Search Report and Written Opinion, Nov. 21, 2022 (12 pages).

(Continued)

*Primary Examiner* — Thanh Luu
(74) *Attorney, Agent, or Firm* — Kilpatrick Townsend & Stockton LLP

(57) ABSTRACT

A hand-held observation device includes: a laser rangefinder (LRF) unit configured to measure a distance between the observation device and a target point on a remote target, a camera configured to capture images of the target, a pose detection unit configured to detect a pose of the observation device, a display unit configured to display an image of the target, a user input device and a digital processing unit comprising a memory for storing program data and mea- (Continued)

surement data. The digital processing unit can receive a measurement request from the user, can receive image data from the camera, can continuously receive pose data from the pose detection unit, can trigger range measurements to target points using the LRF unit, can receive range-measurement data from the LRF unit, can calculate 3D target point coordinates for the target points, can store the 3D target point coordinates in the memory, can compare the stored 3D target point coordinates with the measurement request to determine one or more regions with missing 3D target points coordinates, can monitor the pose of the observation device based on the pose data, can detect when the measurement axis of the LRF unit aims at a region with missing 3D target point coordinates, and can trigger an additional range measurement for measuring 3D target point coordinates.

15 Claims, 7 Drawing Sheets

(51) Int. Cl.
    *G01C 15/00*        (2006.01)
    *G01S 7/51*        (2006.01)
    *G01S 17/50*       (2006.01)
    *G01S 17/86*       (2020.01)

(56) References Cited

U.S. PATENT DOCUMENTS

| | | | |
|---|---|---|---|
| 2008/0075326 A1 | 3/2008 | Otani et al. | |
| 2008/0231827 A1 | 9/2008 | Siercks | |
| 2021/0080256 A1* | 3/2021 | Ito | G01C 15/002 |

FOREIGN PATENT DOCUMENTS

| | | |
|---|---|---|
| EP | 1744196 A1 | 1/2007 |
| EP | 1744196 B1 | 2/2012 |
| EP | 2659288 A1 | 11/2013 |
| EP | 3196593 A1 | 7/2017 |
| WO | 0175396 A1 | 10/2001 |
| WO | 2006081889 A1 | 8/2006 |
| WO | 2015066319 A1 | 5/2015 |

OTHER PUBLICATIONS

International Application No. PCT/EP2022/072468, International Preliminary Report on Patentability, Mar. 14, 2024, 7 pages.

* cited by examiner

HAND-HELD OBSERVATION DEVICE AND METHOD FOR OBTAINING A 3D POINT CLOUD

The invention relates to a hand-held observation device comprising a laser rangefinder and to a computer-implemented method for obtaining a 3D point cloud of a remote object using such a hand-held observation device. In particular, the invention relates to the field of hand-held military optronics devices, and provides a method for measuring a 3D point cloud as a representation of a target object without the need for beam steering means and based solely on the evaluation of sensors which are present in known handheld observation devices.

Such observation devices have diverse fields of application, for example in hunting, for landmark navigation on land or at sea, for aiming at objects, for acquiring and documenting geographic surroundings, as information device for hikers, etc. In addition to such civilian fields of application, such devices are also used in the military sector for navigation, observation, etc. It is important for the device to be robust, convenient, operable in a quick and simple manner, and as compact and as lightweight as possible and to have comparatively low power consumption.

The observation devices within the scope of the present invention are robust devices designed for use in the field. These devices often are not highly precise and usually have measurement resolutions of the order of meters or, at best, decimetres, but have measurement ranges of several kilometres, for example of up to five, ten or twenty kilometres or even more. The observation devices are primarily designed for hand-held use by human operators, i.e., for example, as field glasses or binoculars, monocular telescopes, spotting scopes, etc., but can by all means be attached to a tripod or the like if necessary.

The observation devices treated here can particularly comprise an optically transmissive light channel, i.e. being conventional optical devices in terms of the basic function thereof, in which optical radiation is directed directly from the observed target object into the eye of the observer. However, in other embodiments, these can also be observation devices in which an observation image is recorded using a camera, the image is converted into electrical signals and the electrical signals are reproduced for the observer on a screen display. Here, especially in the case of the devices with a screen, the observation through an eyepiece, through which the recorded observation image can be observed, can be brought about in the conventional manner. Here, the observation path can comprise optical elements for beam shaping, beam deflection, mirroring information in and out, amplifying residual light, etc. Specifically, this can relate to hand-held observation devices or distance-measuring observation devices which are generically embodied for use as a hand-held device, for example by appropriate handles, shaping, etc.

Here, the optical targeting enabled by the observation device also determines the direction of the distance measurement. The point to be measured is targeted by means of the transmissive light channel, for example with crosshairs in the observation channel of the device. In the case of electro-optical distance meters or laser rangefinders (LRF), an optical signal, for example as optical radiation in the form of laser light pulses, is emitted by the device in the direction of the target object, the distance of which is intended to be determined. If visible light is used in the process, the point on the target object targeted for measuring purposes can be identified visually in the case of appropriate light conditions.

However, non-visible wavelengths, e.g. in the infrared spectral range, are often used and the point on the target object targeted for measuring purposes is determined for the user purely by targeting with the observation channel of the device.

The surface of the target object casts back at least a portion of the emitted optical signal, usually in the form of a diffuse reflection. In the device, the cast-back optical radiation is converted into an electrical reception signal by a photosensitive detector element. The distance between the device and the target object can be determined with knowledge of the propagation speed of the optical signal and on the basis of the determined travel time between emission and reception of the signal (i.e. the travel time which light requires for covering the distance from the device to the target object and back again). Usually, there are one or more optical components for beam shaping, deflection, filtering, etc.—such as lens elements, wavelength filters, mirrors, etc.—in the optical transmission or reception path. Transmission and reception can be brought about coaxially using a single optical unit or separately using two separated optical units (e.g. arranged next to each other). Here, the distance meter or the rangefinder is integrated in the observation device.

The measurement requires sufficiently strong signal intensities, which can be detected by the receiver, of the returning reception signal. However, the signal power that can be emitted from the optoelectronic LRF considered here is restricted by physical and regulatory limits. Therefore, the intensity amplitude of the emitted optical signal often is modulated in a pulse-like manner. Temporally short pulses with a high peak power are emitted, followed by pauses during which no light is emitted. Hence, the cast-back component of the pulses has a sufficiently high intensity to allow these to be evaluated in the presence of background disturbances and noise, in particular even in the presence of background light (sunlight, artificial illumination, etc.).

In the case of observation devices with rangefinders, ranges from several metres up to many kilometres, for example from 50 m to 20 or 30 km, are required in this case, and this is required with a measurement accuracy of several meters or even higher measurement accuracy, for example of ±5 m or ±1 m or less. Since, in general, the measurement target does not have special reflective target markers for the measurement (as is conventional in measurement rods, measurement prisms etc. used in surveying), the applied optical distance measurement signal must be embodied and set in the device design in such a way that a distance measurement is possible over the whole specified measurement range (or the range must be specified on the basis of the possibilities of the used signal). Since only a small portion of the emitted radiation returns to the receiver in the case of natural or non-cooperative targets, usually the signal information from a plurality of pulses is used cumulatively (in particular in-phase) for the evaluation (multi-pulse LRF). In the process, the signal-to-noise ratio (SNR) is improved in order thereby also to enable measurements in adverse conditions. By using a plurality of measurement light pulses on the same target point, disturbance signals are removed by averaging and the target signal is amplified, corresponding to a theoretical SNR improvement of approximately the square root of the number of accumulated pulses.

In a typical use scenario, the user aims the observation device at a desired target and then triggers the distance measuring process, for example by actuating a trigger button or the like. Thereupon, the measurement result, or further in-depth information derived therefrom, such as 3D coordinates, are displayed to said user, preferably directly in the observation channel of the observation device.

The observation device can be equipped with means for determining geographic coordinates, such as a GNSS antenna, a constellation identifier, a direction measuring unit, a compass unit, tilt sensors or accelerometers, a night vision function, etc. Using an electronic display for providing information, it is possible, for example, to provide to the user in the transmitted light channel an image from a camera, location information, for example in the form of a map, measured distances or directions, stored information in respect of a sighted target object, temperature and weather information using the electronic display. Depending on field of application and demands on the respective measurement situation, the observation device may, in a modified embodiment, be equipped with e.g. a night vision module, etc. In this context, EP 1 744 196 proposes, in an exemplary manner, several different embodiments for a generic observation device, for example for target marking, for military applications or for hunting purposes.

Generic handheld observation devices are commonly used for military purposes and related applications, e.g. for use in police operations. Such devices include cameras with long-focus lens to observe distant objects and/or use telescopic sight for the purpose. Supporting sensors are included in such observation devices, comprising, e.g. GNSS, digital compass, IMU. A laser rangefinder allows measurement (e.g. using time-of-flight (TOF) principles) of a distance to remote target objects. In a military purpose, this distance may be used, e.g., to calculate fall of shot for indirect fire or coordinates for close air support. Such handheld observation devices preferably are ruggedized, lightweight and as small as possible to not be a burden during troop movement or manoeuvre. Directly related is the need for low power consumption, as otherwise the handheld observation device would need to be equipped with large and heavy batteries to guarantee device operation during mission.

Within military applications, remotely obtaining or augmenting three-dimensional (3D) models from a terrestrial perspective is a requirement, e.g. for fire-and-forget missile guidance to occluded parts of targets. However, carrying tripod-based laser scanners or tacheometers dedicated for this purpose disadvantageously puts extra burden to troops. Consequently, an integration of a point-cloud-measurement functionality into an available multifunctional observation device is desirable.

Application of computer vision methods allow calculating distances and 3D point coordinates from processing images registered by cameras integrated in handheld observation devices. Unfortunately, such application is not generally possible for a single view of an unknown target object. On the other hand, multi-view vision is a problem with military application as the camouflage of target objects lead to low image contrasts and erroneous point correspondence finding.

The use of a scanning laser range finder to obtain 3D models of remote objects is the base of laser-scanner technology. Typically, a laser scanner actively moves a laser range finder beam in a scanning motion over a target object to obtain a multitude of measured points of the target object's surface. For such controlled precise movement of the laser beam (in two degrees of freedom) a beam steering means (e.g. comprising a motorized mirror or MEMS mirrors) is necessary. In military and related applications, the distance between observer and the target generally will be more than 100 metres. Desired 3D point coordinate precision is then generally about 1 metre in all coordinates. Such a high target distance in combination with the desired coordinate precision would generate a need for a high angular precision for the beam steering means. Integrating such high angular precision beam steering means into a handheld observation device would significantly increase weight, size and power consumption of the device and is therefore undesirable.

A handheld observation device should be able to perform laser rangefinder (LRF) measurements, wherein manual changes of a pose of the LRF is continuously tracked by a pose measurement means of the device. The aim for high 3D coordinate precision transfers and the long range target distance of military applications necessitate a high precision pose measurement. Especially for military purposes, a laser eye-safety class 1 is mandatory for the LRF. On the one hand, this prevents accidents on own troops when using the device. On the other hand, this allows securely performing the observations without being easily spotted. Whereas the widespread use of observation devices or telescopes in the field prevents laser class 1M, the mandatory invisibility of the laser prevents laser class 2.

Application requirements with respect to LRF range, precision and short measurement time (high repetition frequency) can be fulfilled, for example, by combining single mode laser with small divergence based on fibre technology. An alternative to the scanning LRF laser over the target object, is the Range Imaging (RIM) technology, where the target is illuminated by a single LRF emitter and the reflected signal is received by a raster of LRF receivers (RIM pixels) each having a disjunct reception angle. A single illumination pulse provides the energy for all LRF receivers' 3D measurements and the pulse energy is distributed among the different receivers' reception angles. For a high-resolution 3D LRF, many RIM pixels would be needed, so that the distribution of energy would prevent application of eye-safety class 1 RIM systems for measuring distances beyond about 1 km, i.e. a distance which would be of high interest for military purposes. This leads to demand for a scanning LRF system.

U.S. Pat. No. 5,859,693 discloses a modularized laser-based survey system which comprises an LRF module which can be fixed with an angle encoder module to a reference point. While the handheld observation device could be used as LRF module and fixed with an angle encoder to a tripod (reference point), the need of such extra equipment (tripod, angle encoder) again objects the aim for multipurpose low weight small size equipment, e.g. for military purposes such as mobility of troops. A similar system is disclosed in WO 2001/75396 A1. Both publications optionally allow measuring the orientation of the LRF device internally with magnetic compass and/or gravity sensor. The use of the magnetic compass is disturbed by widespread magnetic field disturbances, and the precision measurement of gravity field is only possible for non-accelerated devices, which contradicts the aim for quick point cloud measurement. It would be desirable to have an observation device that allows high precision 3D point measurement without the need for a tripod, i.e. a hand-held observation device that allows high precision 3D point measurement.

The system disclosed in WO 2006/81889 measures the distance between two remote 3D target points on a plane (e.g. on a wall). The user moves the hand-held device between the two points and the LRF performs distance measurements with a high repetition rate. The pose of the device is not measured and there is no (direct) angle measurement. Similar systems are disclosed in DE 19 836 812 and DE 10 253 669 A1. However, the method is limited to measurements on planes, and for this measurement only the two or three extremal points of the point cloud are evaluated. The LRF laser emits in the visual wavelength band for the user to be able to see the laser beam and thereby control the manual movement of the beam. The high repetition rate LRF measurements are started and stopped by the user at the two 3D target points and the number of performed excess 3D measurements depends on the swift and precise movement of the user.

Such emission of visual radiation however is disadvantageous for many applications, e.g. for hunting or military-use handheld observation devices, because it reveals the presence and position of the observer. Even emission of non-visual NIR radiation is omitted, because that can be detected even with simple devices such as mobile phone cameras. For the purpose of observer hiding, the military LRF emission is shifted to IR bands (e.g. SWIR) where detection with a silicon based CCD or CMOS camera is prohibited (the Si bandgap energy limits detection to wavelength of less than 1100 nm). Additionally, for military applications any excess LRF emission should be omitted, since targets such as armoured vehicles, tanks or helicopters are often equipped with devices dedicated for detection of hostile LRF measurement (laser warning receiver, e.g. "Shtora-1") which may automatically trigger powerful countermeasures. Performing many excess measurements, as described by the methods above, disadvantageously will lead to a high-power consumption due to the excess laser emission (long range measurement) and the processing of the excess measurement data. It would be desirable to have a device that allows high precision handheld point cloud measurement to arbitrary object shapes and without excess laser emission.

EP 2 659 288 discloses a handheld laser distance measurement device which uses active beam steering means in only one direction (one degree of freedom). The beam movement, provided by the beam steering means, generates a visual laser fan which is visible to the user. The user thus is enabled to manually scan the fan over the target object. The manual movement of the user is measured by a pose measurement of the handheld device. From LRF measurement and pose measurement, the 3D target points are calculated. Disadvantageously, the visual LRF is visible not only by the user and thus prevents military applications. Also, there are no means for omitting excess measurements, e.g. double measuring of the same target point or measuring to target points which are of no interest. Furthermore, disadvantageously, the method needs active beam steering means to be integrated into the device.

U.S. Pat. No. 9,285,481 discloses a wearable object locator and imaging system which uses a camera image combined with a LRF measurement and a pose measurement to generate 3D measurements. The pose measurement is performed by a second camera, which evaluates the image of a reference target dedicated for the pose measurement. The use of a dedicated fixed reference target for pose estimation is cumbersome. Therefore the patent describes a variant where the reference target is fixed at the users wear. The precision of such pose measurement is not very high and the method limited to documenting close range scenes.

WO 2015/66319 describes a system and method for measuring by laser sweeps which combines an inertial measurement unit (IMU) with a laser range finder to measure a 3D point cloud. The IMU pose measurement can be supported by a dynamic model adapted to the user's body geometry. Again, high repetition rate LRF measurements are started by the user before moving the handheld device and stopped by the user when the movement is finished and, again, excess measurements are not prevented and the completeness/density of point cloud information cannot be guaranteed. Disadvantageously, an emission of the laser into forbidden sections of the field of view (e.g. a military laser warning receiver) cannot be prevented.

Involuntary or arbitrary movement during observation, e.g. physiologic tremor, poses a problem for many use cases of hand-held observation devices comprising laser rangefinders. EP 3 196 593 A1 discloses a generic hand-held device comprising a stabilization functionality for the laser rangefinder in order to compensate movements such as hand jitter. Hand jitter can be due to physiologic tremor, i.e. a trembling of the hand with a usual frequency of about ten times per second. Physiologic tremor occurs in normal individuals, especially when they are stressed by anxiety or fatigue. It may occur in an enhanced form as a pathological symptom of conditions such as hyperthyroidism or stimulants such as caffeine. It would be desirable to have a device that allows high precision handheld point cloud measurement despite hand jitter.

It is therefore an object of the present invention to provide an improved hand-held observation device with an opto-electronic rangefinder for measuring the distance to a targeted object.

It is a particular object of the invention to provide such a hand-held observation device which allows obtaining 3D point clouds of distant target objects with a high accuracy.

It is a further object to provide such a hand-held observation device that is light-weight, small and sturdy, has a low energy consumption and can be built without a high constructive effort. In particular, it is an object to provide such a hand-held observation device without or with less moving parts, e.g. a device that does not need any beam steering means or active stabilization.

It is a further object to provide such a hand-held observation device that can be used for military purposes, i.e. observation of military targets. In particular, it is an object to provide such a hand-held observation device that allows observing military targets without being noticed, e.g. without the danger of activating an automated laser warning at the target.

A further object of the invention is to provide additional flexibility for the user and/or for upgrading generic observing devices with minimal technical outlay.

It is another of the invention to provide an improved method for obtaining a 3D point cloud of a remote target that can be used with such a hand-held observation device.

At least one of these objects is achieved by the hand-held observation device of claim 1, the method of claim 10 and/or the dependent claims of the present invention.

A first aspect of the present invention pertains to a hand-held observation device comprising:

a laser rangefinder (LRF) unit configured to measure a distance along a measurement axis between the observation device and a target point on a remote target and to generate range-measurement data;

a camera configured to capture images of the target and to generate image data;

a pose detection unit configured to detect a pose of the observation device and to generate pose data;

a display unit configured to display an image of the target based on the image data together with the measurement data to a user of the observation device;

a user input device configured to receive user inputs from the user; and a digital processing unit comprising a memory for storing at least programme data and measurement data.

The digital processing unit of the hand-held observation device is configured

- to receive a measurement request from the user via the user input device,
- to receive image data from the camera,
- to continuously receive the pose data from the pose detection unit,
- to trigger range measurements to one or more target points using the LRF unit,
- to receive range-measurement data from the LRF unit,
- to calculate, based on the pose data and on the range measurement data, 3D target point coordinates for the one or more target points, and
- to store the 3D target point coordinates in the memory (e.g. as a point cloud).

According to this aspect of the invention, the digital processing unit is further configured

- to compare the stored 3D target point coordinates with the measurement request to determine one or more regions with missing 3D target points coordinates (e.g. gaps in a point cloud),
- to continuously monitor the pose of the observation device based on the continuously received pose data,
- to detect, based on the continuously monitored pose, when the measurement axis of the LRF unit aims at one of the determined regions with missing 3D target point coordinates, and
- to automatically trigger an additional range measurement of the LRF unit for measuring 3D target point coordinates in the region (e.g. gap) the measurement axis aims at.

According to one embodiment of the hand-held observation device, the digital processing unit is further configured

- to calculate, based on the pose data, image positions for a plurality of stored 3D target point coordinates in the displayed image, and
- to trigger displaying, on the display unit, the image with overlaid markers at the image positions.

In some embodiments, the images captured by the camera are an image stream, and the images displayed on the display unit are live images.

In some embodiments, the 3D target point coordinates are stored in the memory together with pose data relating to a pose of the hand-held observation device at the time of the measurement of the distance between the observation device and the respective target point.

In some embodiments, the digital processing unit is configured to trigger displaying, on the display unit, a reticle indicating a measurement axis of the laser rangefinder unit in the image and/or instructions for the user to aim the hand-held observation device to a region with missing 3D target point coordinates.

According to one embodiment of the hand-held observation device, the digital processing unit is configured

- to perform a pose-prediction functionality which comprises using a Kalman filter or another dynamic model to continuously predict the pose of the observation device for a point in the near future,
- to continuously monitor the predicted pose of the observation device in the near future,
- to determine, based on the continuously monitored predicted pose, when the measurement axis of the laser rangefinder unit is about to aim at one of the determined regions with missing 3D target points coordinates, and

- to automatically trigger an additional range measurement of the laser rangefinder unit for measuring, at the point in the near future, 3D target point coordinates in the region the measurement axis is about to aim at.

The "near future" particularly is a time span that does not exceed the next second, for instance includes the next tenth or hundredth of a second.

In some embodiments, said pose-prediction functionality comprises

- detecting and continuously monitoring, based on the received pose data, a tremor of the user's hand holding the observation device,
- using the dynamical model to estimate dynamic parameters of the device effected by the tremor, the dynamic model preferably being optimized on hand-jitter dynamics, and
- predicting the pose of the observation device for the point in the near future based on the estimated dynamic parameters.

In some embodiments, said pose-prediction functionality comprises

- using an adaptive system, e.g. an artificial neural network, to learn a hand movement dynamic of the user's hand holding the observation device to obtain an enhanced prediction model for the pose of the device, and
- predicting the pose of the observation device for the point in the near future based on the enhanced prediction model.

According to another embodiment of the hand-held observation device, if the remote target is a military target, such as, e.g., an armoured vehicle, the digital processing unit is configured to perform a forbidden-region-detection functionality. For instance, the military target comprises laser beam detection means that are configured for detecting a laser beam emitted by the laser rangefinder unit, particularly wherein the laser beam detection means is configured to determine a position of the hand-held observation device based on the detected laser beam.

This forbidden-region-detection functionality comprises

- identifying, in an image of the target and/or in the image data, a forbidden region on the target and assigning an image position to the forbidden region, e.g. wherein the forbidden region includes the laser beam detection means of the target,
- determining 3D coordinates of the forbidden region based on the image data, the pose data and the image position of the forbidden region,
- continuously monitoring the pose of the observation device based on the continuously received pose data, and
- detecting, based on the continuously monitored pose, when the measurement axis of the LRF unit aims at the forbidden region.

A range measurement of the LRF unit to the forbidden region is then automatically prevented.

In some embodiments, identifying the forbidden region comprises using image recognition by the digital processing unit. In some embodiments, identifying the forbidden region comprises displaying an image of the target and receiving a user selection of an image position as the forbidden region. In one embodiment, identifying the forbidden region comprises using image recognition by the digital processing unit, displaying an image of the target overlaid with a marker for an identified forbidden region, and receiving a user selection of an image position as the forbidden region.

According to another embodiment of the hand-held observation device, the 3D target point coordinates are stored in the memory as a point cloud, a database with 3D data of a plurality of different target kinds is stored in the memory, and the digital processing unit is configured to analyse the point cloud to recognize the target kind of the remote target.

In some embodiments, the digital processing unit is configured to effect display of information about the determined target kind on the display unit.

In some embodiments, analysing the point cloud comprises calculating a best match.

In some embodiments, the digital processing unit is further configured to analyse the point cloud to determine a pose of the determined target, and particularly to effect display of information about the pose on the display unit.

According to another embodiment—where the plurality of different target kinds is or comprises a plurality of different military target kinds, e.g. armoured vehicle kinds, and at least a subset of the plurality of different military target kinds comprises laser beam detection means that are configured for detecting a laser beam emitted by the laser rangefinder unit—the 3D data includes a 3D position of the respective target kind's laser beam detection means, the digital processing unit is configured to analyse the point cloud to determine a pose of the target, and the determined 3D coordinates of the forbidden region are corrected based on the determined pose of the target and the 3D position of the laser beam detection means on the target kind.

A second aspect of the invention pertains to a computer-implemented method for obtaining a 3D point cloud of a remote object using a hand-held observation device comprising a laser rangefinder (LRF) unit, for instance a hand-held observation device according to the first aspect of the invention. The method comprises receiving a measurement request from a user of the hand-held observation device via a user input device of the hand-held observation device, receiving image data of the remote target from a camera of the hand-held observation device, continuously receiving pose data of the hand-held observation device from a pose detection unit of the hand-held observation device, triggering range measurements to one or more target points on the remote target using the LRF unit of the hand-held observation device, receiving range-measurement data from the LRF unit, calculating, based on the pose data and on the range measurement data, 3D target point coordinates for the one or more target points, and storing the 3D target point coordinates in a memory unit of the hand-held observation device (e.g. as a point cloud).

According to this aspect of the invention, the method further comprises comparing the stored 3D target point coordinates with the measurement request to determine one or more regions at the remote target with missing 3D target points coordinates (e.g. gaps in a point cloud), continuously monitoring the pose of the observation device based on the continuously received pose data, detecting, based on the continuously monitored pose, when the measurement axis of the laser rangefinder unit aims at one of the determined regions with missing 3D target point coordinates, and automatically triggering an additional range measurement of the LRF unit for measuring 3D target point coordinates in the region (gap) the measurement axis aims at.

According to some embodiments, the method further comprises displaying an image of the target based on the image data, particularly as a live image stream, calculating, based on the pose data, image positions for a plurality of stored 3D target point coordinates in the displayed image, and displaying the image with the positions as overlaid target point markers.

In some embodiments, the method comprises displaying a reticle indicating the measurement axis of the LRF unit in the image.

In some embodiments, the method comprises displaying instructions for the user to aim the hand-held observation device to a region with missing 3D target point coordinates.

According to some embodiments, the method further comprises using a dynamic model, e.g. a Kalman filter, to continuously predict the pose of the observation device for a point in the near future, continuously monitoring the predicted pose of the observation device in the near future, determining, based on the continuously monitored predicted pose, when the measurement axis of the LRF unit is about to aim at one of the determined regions with missing 3D target points coordinates, and automatically triggering an additional range measurement of the LRF unit for measuring, at the point in the near future, 3D target point coordinates in the region the measurement axis is about to aim at.

In some embodiments, the method comprises detecting and continuously monitoring, based on the received pose data, a tremor of the user's hand holding the observation device, using the dynamical model to estimate dynamic parameters of the device effected by the tremor, particularly wherein the dynamic model is optimized on hand-jitter dynamics, and predicting the pose of the observation device for the point in the near future based on the estimated dynamic parameters.

In some embodiments, the method comprises using an adaptive system, e.g. an artificial neural network, to learn a hand movement dynamic of the user's hand holding the observation device to obtain an enhanced prediction model for the pose of the device, and predicting the pose of the observation device for the point in the near future based on the enhanced prediction model.

According to some embodiments, where the remote target is a military target, e.g. an armoured vehicle, and for instance comprises laser beam detection means that are configured for detecting laser beams, the method comprises identifying, in an image of the target and/or based on the image data, a forbidden region on the target and assigning an image position to the forbidden region, e.g. wherein the forbidden region includes a position of the laser beam detection means of the target, determining 3D coordinates of the forbidden region based on the image data, the pose data and the image position of the forbidden region, continuously monitoring the pose of the observation device based on the continuously received pose data, and detecting, based on the continuously monitored pose, when the measurement axis of the LRF unit aims at the forbidden region, wherein a range measurement of the LRF unit to the forbidden region is automatically prevented.

In some embodiments, identifying the forbidden region comprises using image recognition and/or displaying an image of the target and receiving a user selection of an image position as the forbidden region. For instance, identifying the forbidden region may comprise using image recognition, displaying an image of the target overlaid with a marker for an identified forbidden region, and receiving a user selection of an image position as the forbidden region.

According to another embodiment of the method, the 3D target point coordinates are stored as a point cloud and the method further comprises comparing the point cloud with 3D data of a plurality of different target kinds provided in a database to recognize a target kind of the remote target and displaying information about the determined target kind together with an image of the target.

In one embodiment, recognizing the target kind of the remote target is also based on the image data.

In another embodiment, the method comprises analysing the point cloud to calculate a best match, and/or to determine a pose of the determined target.

A third aspect of the invention pertains to a computer programme product having computer-executable instructions for performing, for instance when executed on a digital processing unit of a hand-held observation device according to the first aspect of the invention, the method according to the second aspect.

In the following, the observation device and the method according to the invention are described in more detail in a purely exemplary manner on the basis of specific embodiments schematically depicted in the drawings, with further advantages of the invention also being discussed. In detail:

FIGS. 1a-b show an exemplary embodiment of a hand-held observation device for measuring a distance to a remote object;

FIG. 2 shows an image of a target displayed on a display unit of the hand-held observation device together with overlaid information;

FIGS. 3a-b illustrate automatically filling a gap in a point cloud of the target using the hand-held observation device;

Figures 1A, 1B:
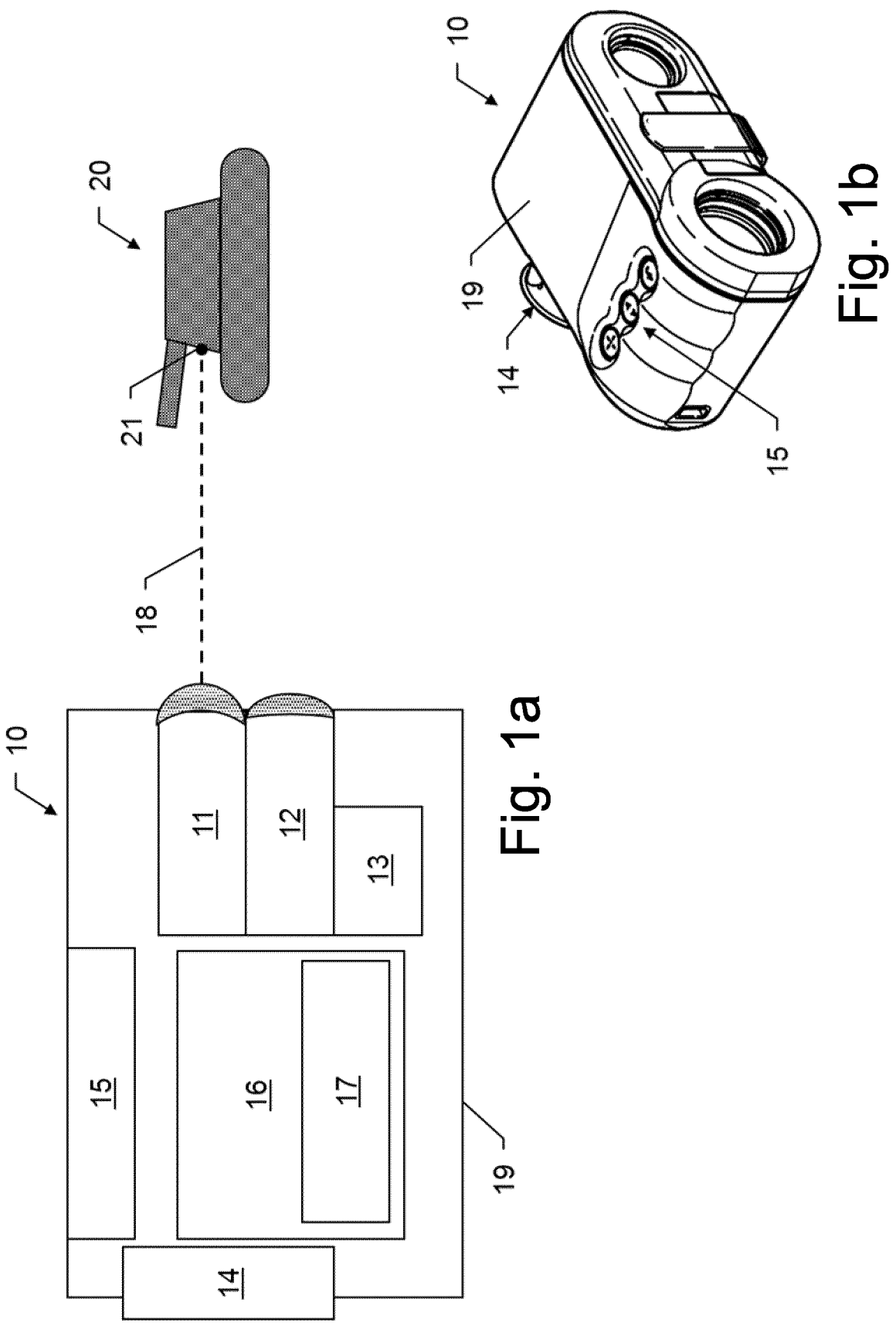

FIGS. 1a and 1b show an exemplary embodiment of an observation device 10 according to the invention. FIG. 1a shows the device 10 schematically and in a sectional view, and FIG. 1b shows an exterior view of the device 10.

The depicted observation device 10 comprises a rugged portable housing 19 that is designed to be held in one or two hands of a user during use of the device, i.e. during observation of a remote target. The observation device 10 further comprises—rigidly fixed and integrated into the housing—a laser range finder (LRF) 11, a camera 12, a pose detection unit 13, a digital processing unit 16, a memory 17 for storing programme data, parameter data and measurement data, a display unit 14 to display image and measurement data to a user of the device, and a user input device 15 to receive user inputs.

The pose detection unit 13 may comprise an inertial measuring unit (IMU), a magnetic compass and similar devices that—alone or in combination—allow determining a pose of the device 10, e.g. in at least three degrees of freedom, and optionally also including the position of the device 10, e.g. in six degrees of freedom. The laser range finder 11, the camera 12 and the pose measurement unit 13 are calibrated to a fixed relative pose and to a fixed pose relative to the portable housing 19.

The LRF 11 comprises an infrared (IR) laser (e.g., solid-state laser, fibre laser, diode laser), and one or more receiver elements able to resolve low photon fluxes (Pin-diode, APD, DAPD, SPAD, DASPAD), favourably mounted rigidly to an optical bench, and signal processing means to measure/calculate the distance. It is configured to emit a laser beam 18 along an emission axis onto a remote target object 20 and to receive reflections of that laser beam from a surface of the target object 20. Based on time-of-flight (TOF) principles, a distance to the object 20 can be calculated and provided as measurement data. The LRF 11 preferably works with a military apt invisible infrared (IR) class 1 laser.

The digital processing unit 16 reads the camera image and effects displaying the camera image on the display unit 14 with the possibility to add overlay information, e.g. measurement data provided by the LRF 11. Via the user input device 15 the user is enabled to select a measurement function, e.g. from a list of possible measurement functions. An example for such a measurement function is the determination of a 3D point cloud as a representation of the target object 20.

The distance between camera 12 and LRF laser beam axis is small and can be neglected for target distances that are relevant for observation purposes, e.g. for distances of more than 100 metres. In some embodiments, the system might be reduced to a coaxial system where the camera 12 and LRF laser beam axis and/or LRF receiver axis share some lens elements and a coincidence of camera center and LRF laser beam and/or LRF receiver axis can be provided.

The user aims the device at the target object 20 and the LRF 11 performs a range measurement to a first target point 21 on the target object 20. The digital processing unit 16 receives measurement data about the measured range and receives pose data from the pose measurement unit 13. It calculates the 3D coordinates of the first target point 21 with respect to a fixed coordinate system, i.e. a coordinate system that is internal to the observation device, and stores these coordinates in its memory 17. The memory may be any suitable computer memory or data storage type, e.g. a volatile or non-volatile memory.

Optionally, the camera 12 may comprise a sensor (e.g. an MCT or InGaAs based image sensor) that is able to detect the wavelengths of the laser emitted by the LRF 11. In this case, a possible misalignment between camera 12 and LRF 11 can be detected and a system recalibration of the relative pose can be performed.

Optionally, the LRF 11 may comprise a receiving array (e.g. a receiver line or receiver matrix) comprising several receiving elements (e.g. pin-diodes, APD, SPAD, DAPD, DASPAD). Collecting measurements of these several LRF receiving elements leads to a higher point density for the 3D image and/or reduced measurement time, because several measurements may be carried out in parallel. Furthermore, such multi-receiver systems improve lateral resolution in scenarios where single receiver resolution is limited by the laser beam diameter at the target 20.

As shown in FIG. 1b, the hand-held observation device 10 may comprise a monocular optical system with a single observation channel, or a binocular optical system comprising a first and a second binocular observation channel. The observation channels are configured for receiving optical light rays and imaging these on an image plane for optical observations by an eye of the user. The display unit 14 optionally may be integrated into the observation channel. The laser rangefinder unit 11 comprise a laser transmission channel and a laser receiver channel coupled into these observation channels.

Figure 2:
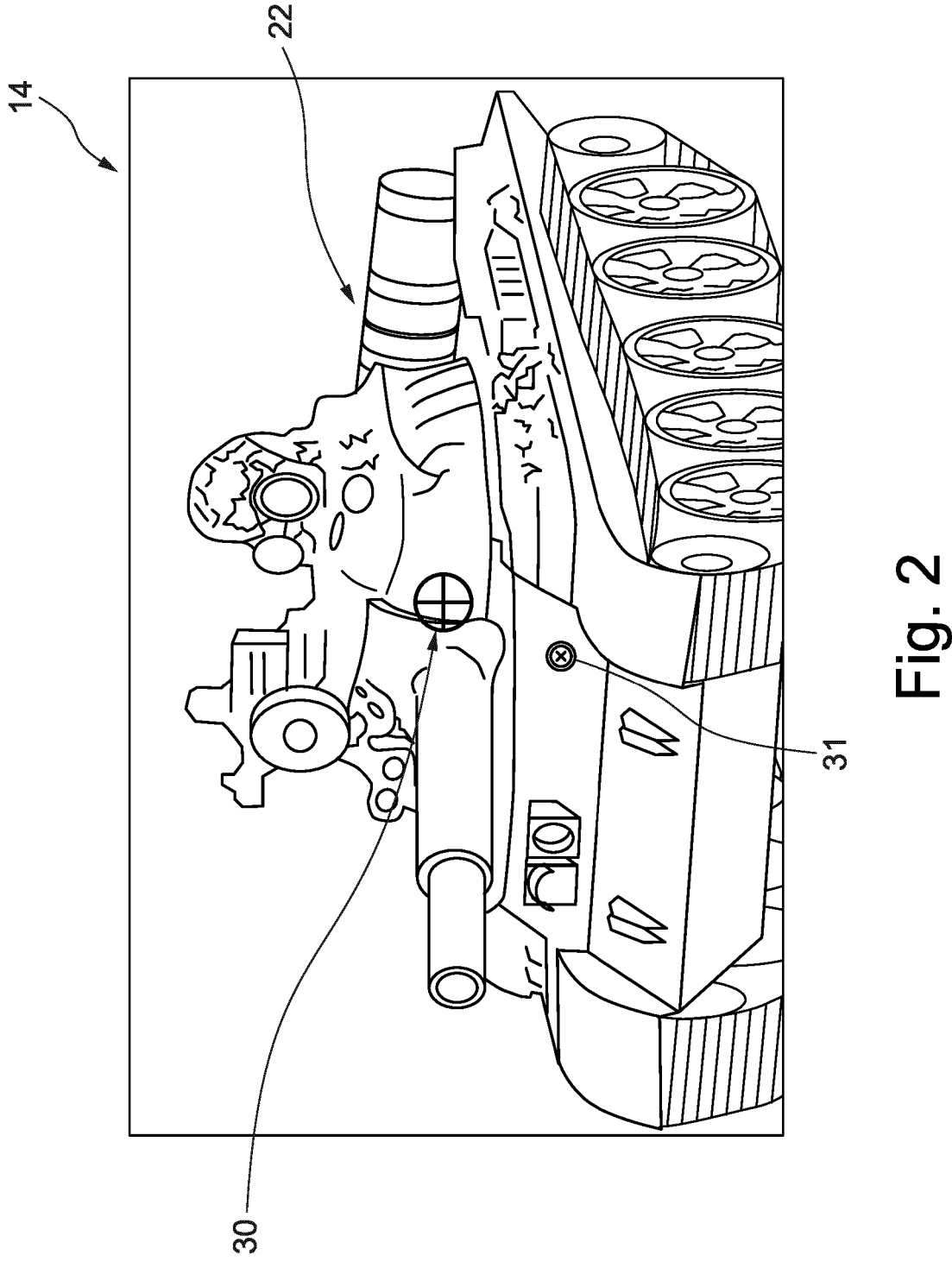

FIG. 2 shows a resulting image 22 of the target on the display unit 14 with a reticle (crosshairs) 30 and a representation marker 31 of the first target point 21 as overlay information.

The reticle 30 marks the present direction of the LRF emission axis in the camera image for the user to aim at the distant target object. Due to the negligible distance between the camera 12 and the LRF emission axis, for relevant observation distances, the image position of the reticle 30 is approximately independent of the distance between the observation device and the target object.

In FIG. 2, after the distance measurement to the first target point, the user has already changed the orientation of the observation device and a second target measurement can be performed to a second point corresponding to the reticle 30 direction projected onto the image 22 of the target object. Meanwhile the digital processing unit 16 uses the pose measurement from the pose measurement unit 13 and the stored 3D coordinate of the first target point and calculates the image position of the first measured target point in the present image and draws a marker 31 to this image position as overlay to the camera image, the marker representing the 3D position of the measured target point on the target in the image 22 of the target.

Figure 3A:
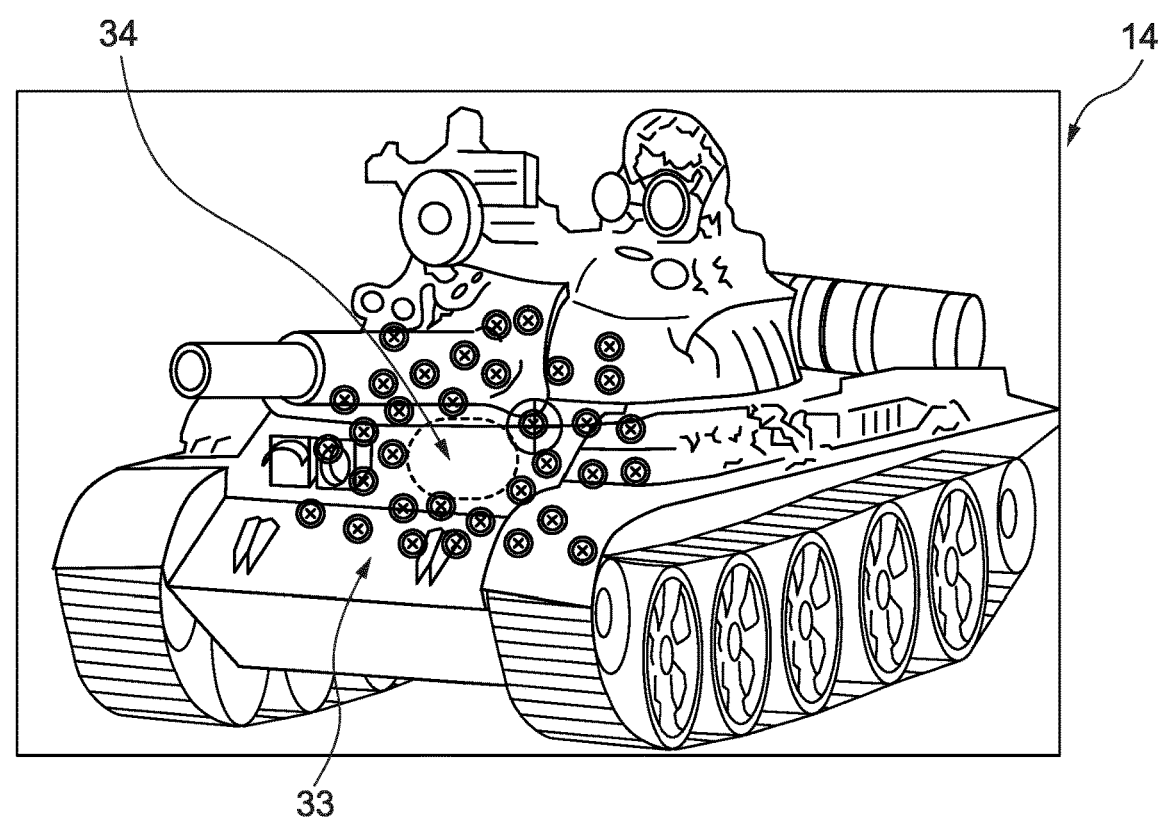

FIG. 3*a* shows an image of the target on the display unit 14 after these distance measurements have been repeated again and again, so that more and more 3D target points are obtained as a 3D point cloud 33 which as well are drawn in an augmented reality operation as image overlay to the display unit. Note that the point cloud 33 is not dense, there is a gap 34 of wanted 3D target points in the centre of the point cloud 33. Such a lack of target points in a certain area may occur due to imprecise user movement.

The digital processing unit 16 recognizes such gaps in the data and the user can be informed, e.g. on the display 14, to direct the LRF emission axis represented by the reticle 30 toward such gap regions 34 to complete the data.

However, hand jitter of the user may pose a limit to such manual scanning and leads to poor data precision. In hand-held observation, instabilities and movements of the device 10 as a result of being held in the hand are to be expected, especially in the form of oscillations or oscillation-like movements as a result of trembling, swaying or twitching of the user. This human hand tremor ("hand jitter") typically has amplitudes in the range of approx. ±1 mrad to ±15 mrad and jitter frequencies in the range from 0 Hz to approx. 20 Hz, which has a clear visible effect, particularly in the case of faraway targets and high magnifications. In the case of distances of the order of kilometres, small changes in angle of the targeting direction already cause lateral "misses" of the observed target corresponding to several meters.

Therefore, continuous, exact targeting of a comparatively small and faraway target is often difficult for the user using a hand-held observation device and requires great concentration and body control. Similar variations in the spatial position of the device can also occur when using the device on an unstable base, such as a land vehicle, aircraft or water vehicle.

To solve the jitter problem and to fill the gap 34, a dynamic model (e.g. Kalman filter) that is optimized on hand jitter dynamics estimates the dynamic parameters of the system to be able to predict LRF pose at short-term future time points. If the predicted (i.e. short-term future) LRF direction is within the gap region 34, the LRF measurement is automatically triggered with an adjusted delay, so that the result then fills exactly the gap 34 in the point cloud 33.

Figure 3B:
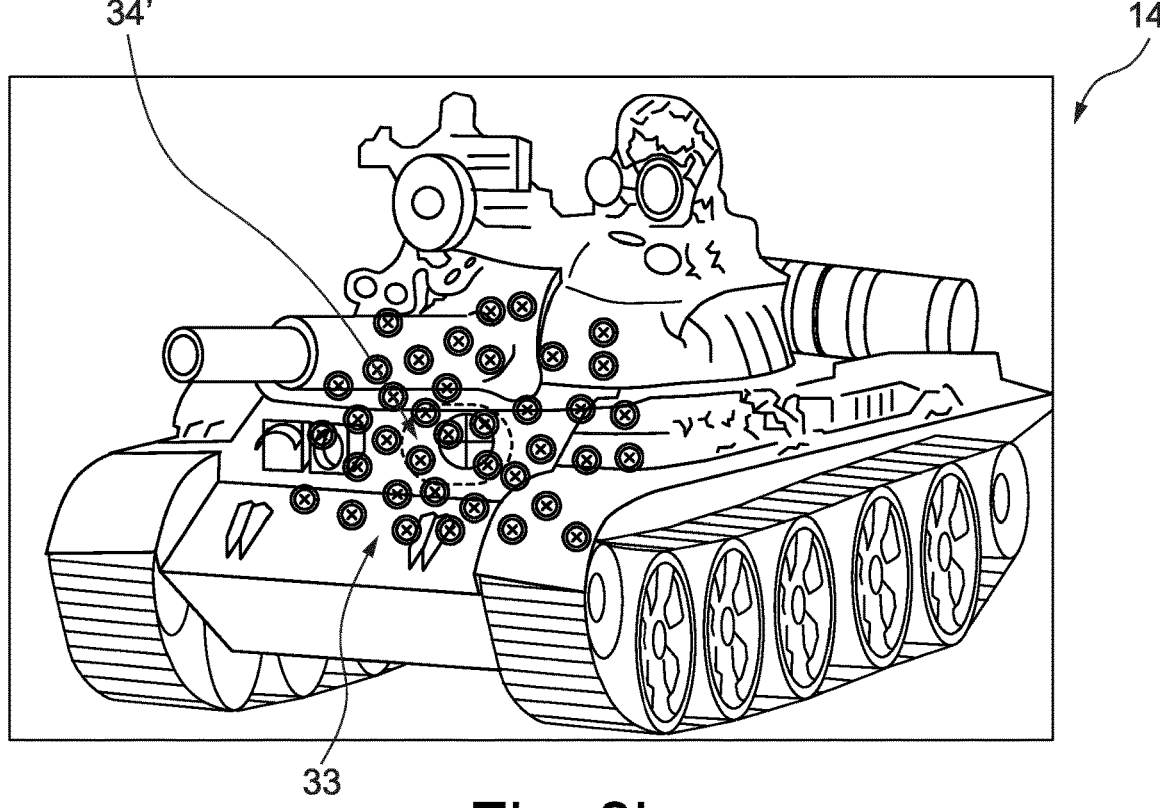

The result is depicted in FIG. 3*b*, where additional 3D points have filled the previous gap 34' of the point cloud 33. However, if the predicted LRF direction of the short-term future is not in a gap region, i.e. within a region that is already sufficiently dense measured, or is in an area of no interest in view of the selected measurement function or even in a forbidden area, the LRF measurement is not triggered so that no laser radiation is emitted.

In some embodiments, an adaptive system (e.g. a neural network) can be used to learn the user's hand movement dynamic to obtain an enhanced prediction model for the pose of the observation device.

For the system to work as described above, a high measurement precision of the pose measurement unit is essential. For instance, a sufficiently high precision can be achieved by a navigation grade IMU and further improved by a combination of IMU and camera. For instance, the pose measurement unit can use the image of the observation device camera and/or comprise its own camera dedicated for the pose measurement process. Especially if a transfer from a fixed device-internal coordinate system to geographical coordinates and/or North-referenced orientation is needed, the pose measurement unit can further include a GPS receiver and/or a digital magnetic compass and/or gyro compass.

The resulting point cloud 33 can be further processed e.g. by fitting geometric primitives like planes or spheres to the point cloud to reduce the amount of 3d data and/or to enhance the precision of 3d coordinates of the target or parts of the target. Especially statistic evaluation of point cloud distance data can be beneficial, if combined with the corresponding measured pose data, to enhance distance precision for parts of the target object. To save processing time this can be started even if the measurement process of the point cloud is still running.

Figure 4:
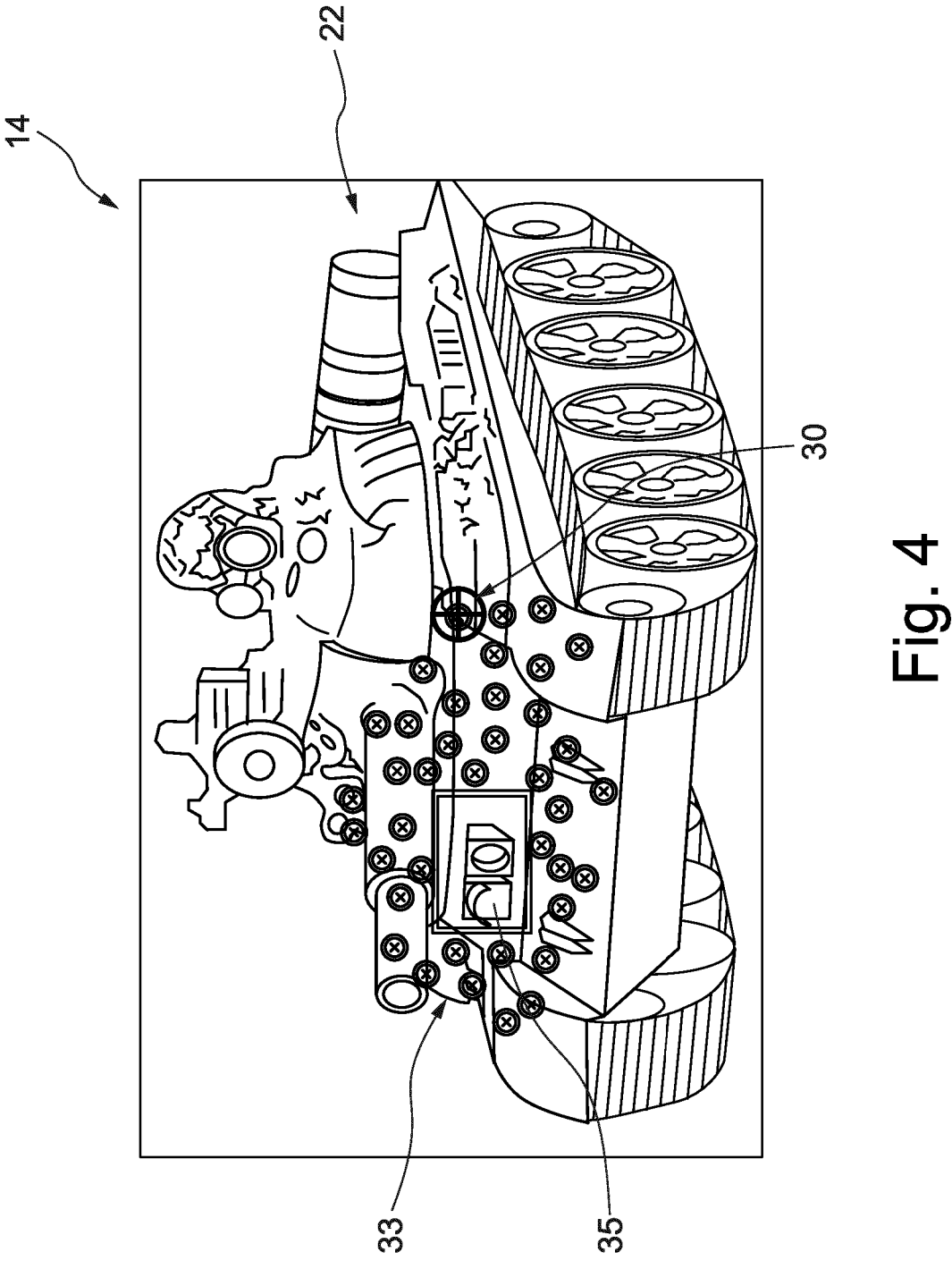
FIG. 4 illustrates automatically omitting a forbidden area when capturing a point cloud of the target using the hand-held observation device.

FIG. 4 illustrates the automatic omission of forbidden regions when capturing a point cloud 33. This is useful in case of a measurement function to a remote target which comprises a laser warning receiver or other areas in the field of view of the measurement to which measurements must be prevented.

The method starts with the capturing a first image of the target object by the camera and measuring the first pose at the exposure time of the first image by the pose measurement unit. The user is presented the first image as a still image on the display unit 14 and manually selects a forbidden region 35 (or a plurality of regions) where measurement must be prevented.

This forbidden region 35 is symbolized in FIG. 4 as a rectangular frame. The image, the respective pose and the forbidden regions are stored for later use. The measurement process continues and the user moves the LRF axis— represented in the image by reticle 30—over the target object.

A dynamic model is used to predict the pose of the observation device at short-term future time points due to hand jitter. The predicted observation device pose is used to calculate from the actual LRF axis direction a simulated image position in the first image by using the first pose and the camera calibration. The simulated image position is compared with the stored forbidden regions 35. If the simulated image position is within a forbidden region 35, the LRF measurement is prevented and no laser light is emitted to that region. The resulting point cloud 33 has a gap in the forbidden region 35, since measurements to this region were prevented.

The same strategy can be used to select regions of interest in the first image instead of forbidden regions, thereby restricting LRF measurements only to those regions of interest.

Alternatively, such regions of interest or forbidden regions can be set automatically (i.e. without user interaction), for instance with a state-of-the-art image segmentation routine evaluating the first image. For example, a contour analysis can be applied to reconstruct the limits of the target object, to prevent measurements which do not hit the target object but would—undesirably—illuminate the background or hit a forbidden region.

Measurements to moving target objects can be performed by image segmentation selecting and tracking the region of interest (target object region) in the subsequent images/measurements. The target object pose change is determined from point correspondences on the target object region and the measured 3D coordinate can be transformed to a coordinate system fixed on the target object. Such measurements to moving target objects are of great interest for ballistic calculus.

As described above with respect to FIGS. 3a and 3b, the selected measurement function can be completed without double measuring to the same target point as the LRF measurement is only automatically triggered if the measurement is actually needed. In some omitting cases, such multi-exposure advantageously allows for a higher class 1 product laser pulse energy with benefit to LRF measurement range and precision.

The description of a single pulse for the LRF measurement is only exemplary and can be generalized to a multi-pulse LRF using a pulse train for each distance measurement as mentioned in the introduction.

An individual multi-pulse LRF measurement can be splitted into several multi- or few-pulse measurements based on the pose system information.

Optionally, an external 3D model of the target object (particularly models of a plurality of different target objects) may be loaded via interface from an external data source to the memory means 17 and used by the digital processing unit for controlling the triggering of the LRF measurement. For example, as illustrated in FIG. 4, the target object may be a military vehicle (e.g. tank) comprising LRF sensors, i.e. laser receivers that can register a measurement and initiate countermeasures. A 3D model of this target object can be used which includes the location of the LRF sensors at this vehicle. This 3D model can then be used to perform a measurement of a point cloud 33 of parts of the vehicle, thereby excluding those regions 35 in which the LRF sensors are located. The point cloud 33 can then be fitted to the 3D model of the target to precisely determine the pose of the vehicle. This pose is then used e.g. as input for ballistic calculus.

The 3D model may be selected manually by the user from the database or be automatically recognized. For instance, the automatic recognition can be based on the camera image. Additionally or alternatively, a point cloud of an initially unrecognized target object can be analysed automatically and compared to the 3D models in the database to determine the kind of object of select the best match as 3D model. This model can be presented to the user on the display unit.

Analysing the 3D point cloud optionally can be done together with a temporal shape (non-localized 3D information within the receiving element of the LRF) of the received pulse. As an alternative for the external 3D model of the target object, the 3D model of the target object can be set up based on 3D measurements performed by the observation device 10.

Figure 5:
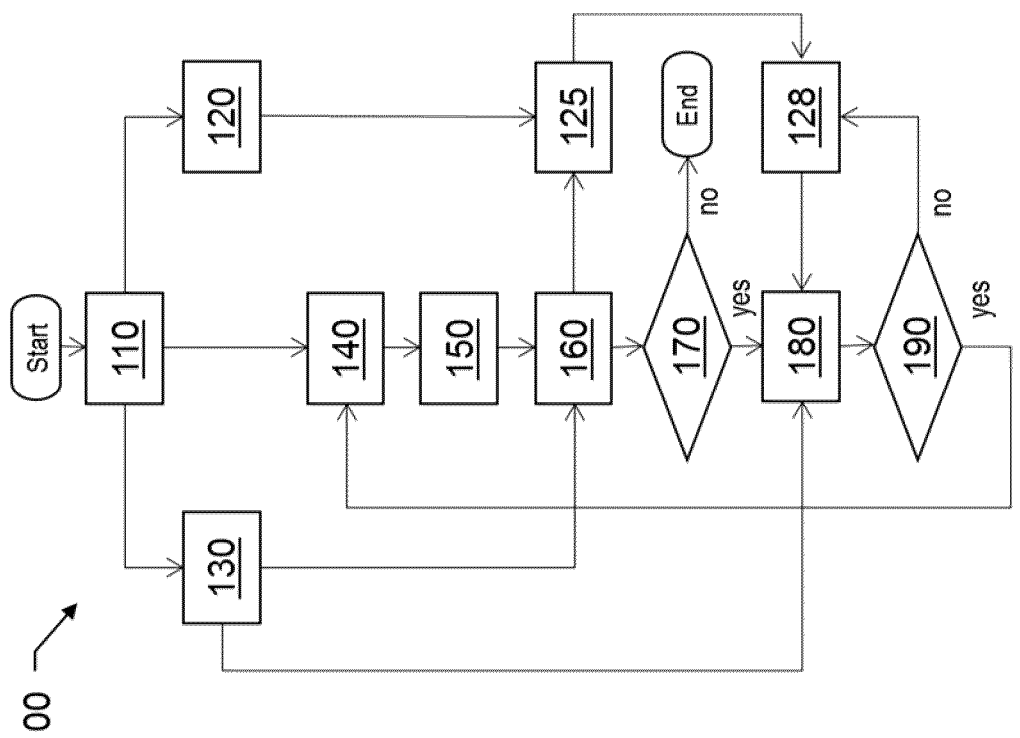
FIG. 5 shows a flow chart illustrating a first exemplary embodiment of a method according to the invention.

In FIG. 5, a first exemplary embodiment of a method 100 for obtaining a 3D point cloud of a remote object 20 using a hand-held observation device is illustrated. The method can be performed at least partially by a computing means, e.g. a digital processing unit, of the used hand-held observation device (computer-implemented method). The used device comprises a laser rangefinder (LRF). For instance, the hand-held observation device can be embodied as the device described with respect to FIGS. 1a and 1b, and the method 100 may be performed automatically by the digital processing unit of said device.

The method 100 starts with receiving 110 a measurement request from a user of the hand-held observation device via a user-input device. Image data of a targeted remote target is received 120 from a camera of the hand-held observation device. At the same time, pose data of the hand-held observation device is continuously received 130 from a pose detection unit of the hand-held observation device. The LRF is triggered 140 to perform a number of range measurements to target points on the remote target, and, consequently, range-measurement data is received 150 from the LRF. Based on the received pose and range measurement data, 3D coordinates of each of the target points are calculated 160 and stored in a memory unit of the hand-held observation device, e.g. in the form of a 3D point cloud.

Optionally, based on the image data, an image of the target may be displayed 125 to the user on a display unit of the hand-held device. For instance, the displayed image can be a live image based on images continuously captured by the device's camera. The displayed image comprises information regarding the measurements to the target points. As illustrated in FIGS. 2 to 4, this information may comprise target point markers overlaid with the image. Therefore, the method optionally comprises calculating, based on the pose data, image positions for a plurality of stored 3D target point coordinates and displaying the markers at the calculated image positions to represent the measured 3D target points. The displayed image may also comprise a reticle indicating a current position of the measurement axis of the LRF.

Afterward, the stored 3D target point coordinates are compared with the user's measurement request to determine 170 whether there are gaps in the point cloud, i.e. one or more regions at the remote target, which in view of the measurement request still have no or an insufficient number of measured target points. If there are no gaps, the user's measurement request is fulfilled and the method 100 ends and is repeated when another measurement request is received 110.

If gaps are detected, the pose of the observation device is continuously monitored 180 using the pose data continuously received 130 from the pose detection unit. Based on said continuously monitored pose, it is then automatically detected 190 when an emission axis of the LRF aims at one of the determined gaps. If the emission axis is within such a gap, an additional range measurement of the LRF is automatically triggered 140, so that additional 3D target point coordinates in the gap are determinable. This can be repeated until all gaps are automatically filled with 3D point coordinates. If the emission axis is not aiming at a gap region, the method continues with continuously monitoring 180 the pose until it is detected 190 that the emission axis of the LRF aims at a gap.

Optionally, the user may be guided to move the measurement axis towards these regions, i.e. by aiming the device at the gaps. This may comprise displaying 128 instructions together with the displayed 125 image, e.g. optical signals such as arrows indicating a direction towards the gap or an optical accentuation of the gap itself. Another option for guiding the user to fill the gap regions, is a haptic feedback or an acoustic feedback performed by the user input device 15 whenever a gap region is filled.

Figure 6:
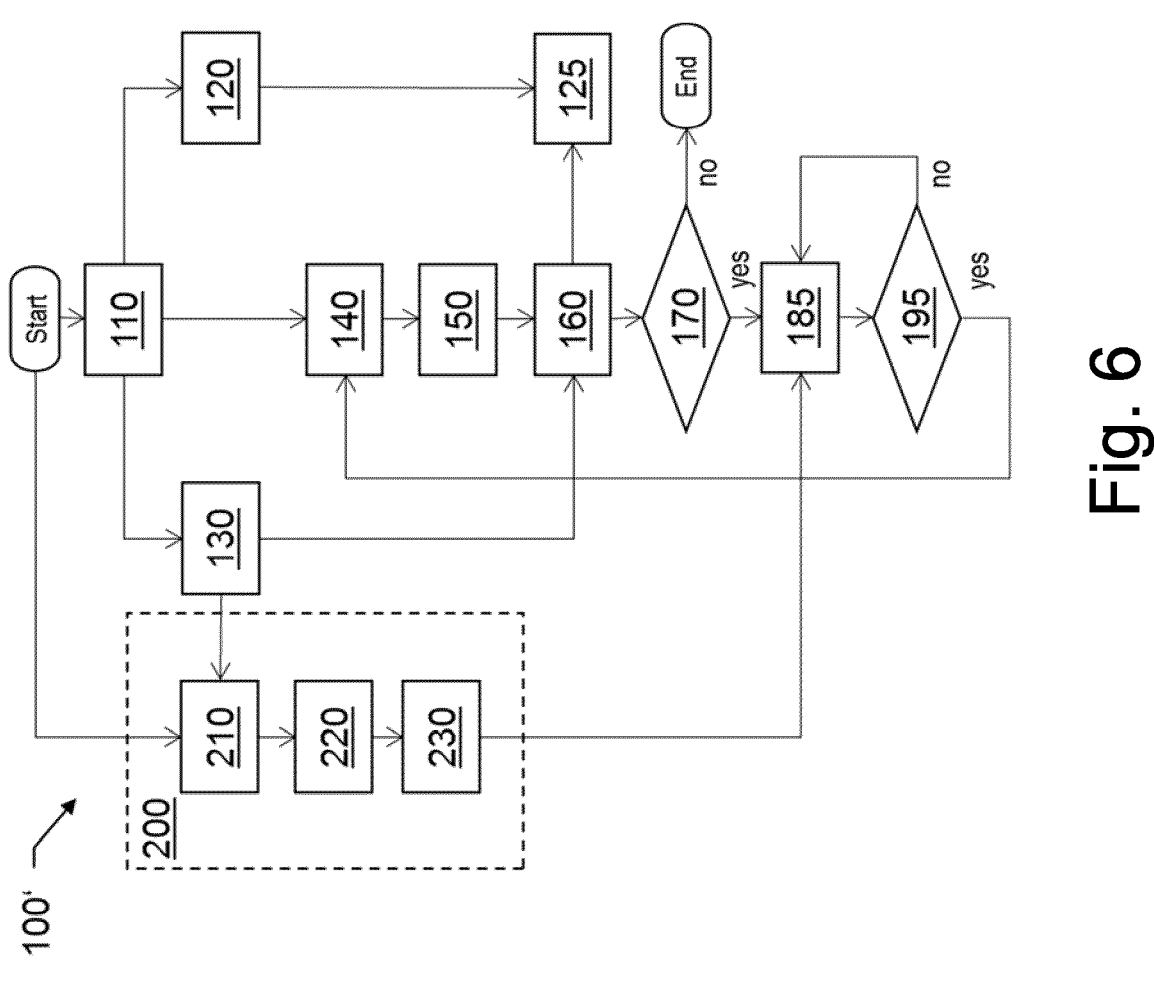
FIG. 6 shows a flow chart illustrating a second exemplary embodiment of a method according to the invention.

FIG. 6 illustrates a second exemplary embodiment of the method 100'. The method comprises the steps 110 to 170 of the method 100 of FIG. 5 and additionally a pose prediction functionality 200.

Said pose prediction functionality 200 comprises using the pose data continuously received 130 from the pose detection unit to continuously monitor a pose of the observation device. The pose prediction functionality 200 further comprises predicting 230 a pose of the observation device for a point in the near future based on the continuously monitored pose and using a dynamic model of the system, e.g. a Kalman filter.

If gaps are detected in step 170, a pose in the near future of the observation device is continuously monitored 185 using the predicted 230 pose of the pose prediction functionality 200. Based on said continuously monitored future pose, it is then automatically detected 195 when an emission axis of the LRF is about to aim at one of the determined gaps. If the emission axis is about to aim at a gap, an additional range measurement of the LRF is automatically triggered 140 with a delay, so that additional 3D target point coordinates in the gap are determinable. This can be repeated until all gaps are automatically filled with 3D point coordinates. If the emission axis is not about to aim at a gap region, the method continues with continuously monitoring 185 the future pose until it is detected 195 that the emission axis of the LRF is about to aim at a gap.

The near future in this regard particularly means a time span between some 10 microseconds and some 100 milliseconds in the future, depending i.a. on the sensitivity of the pose detection, the speed of the used algorithms and the time needed for triggering the LRF measurement. The point in the near future particularly is thus a point in time that lies within the next second, for instance more specifically within the next tenth or hundredth of a second.

This prediction is especially helpful to overcome the problem of hand-held observation devices with hand jitter. The dynamic model is thus preferably optimized on handjitter dynamics and can be used to estimate dynamic parameters of the device effected by a tremor of the user's hand, so that the prediction 230 of the pose is based on the estimated dynamic parameters. Optionally, the hand jitter may be detected and continuously monitored 210 based on the received 130 and continuously monitored pose data. Then, an adaptive system, e.g. a neural network, can be used to learn a hand movement dynamic of the user's hand to obtain 220 an enhanced prediction model for the pose of the observation device, i.e. so that the prediction of the pose 230 includes predicting the hand jitter.

Figure 7:
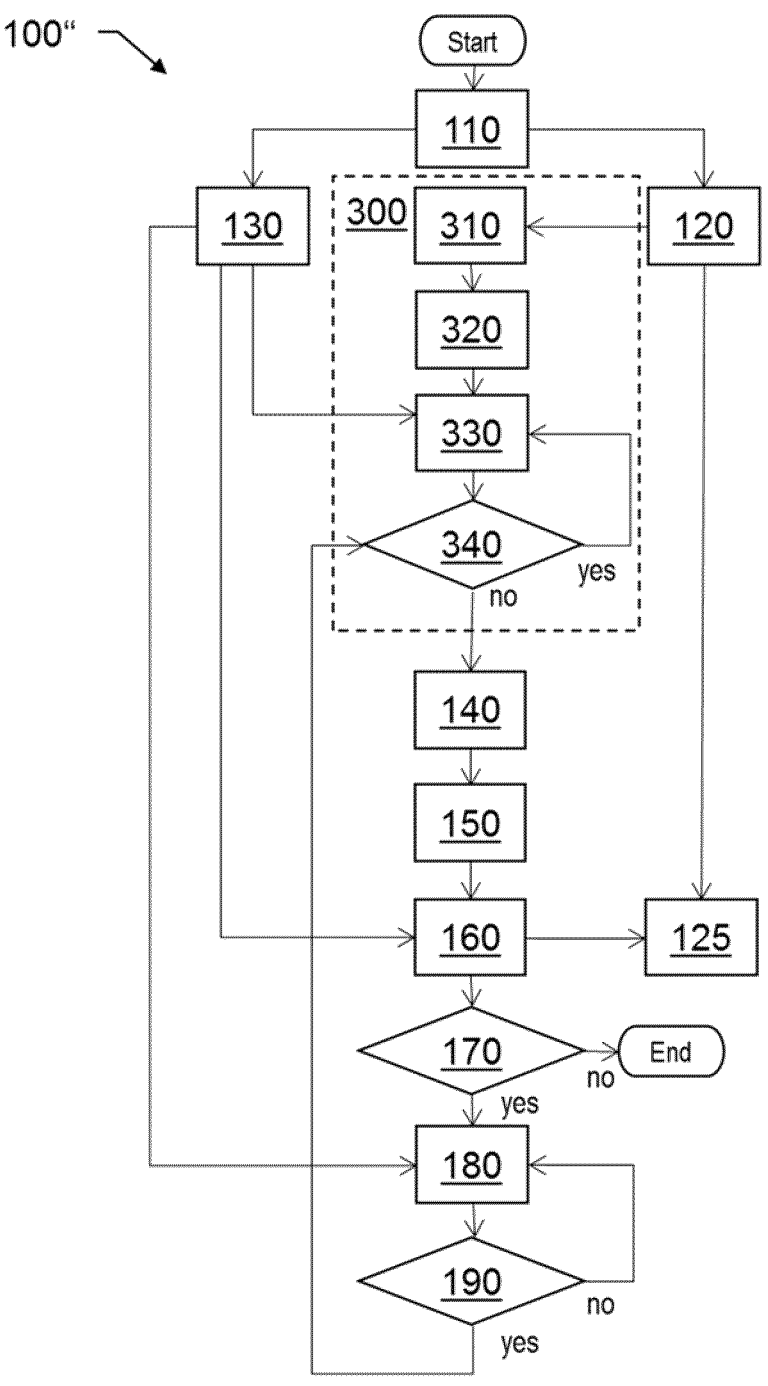
FIG. 7 shows a flow chart illustrating a third exemplary embodiment of a method according to the invention.

FIG. 7 illustrates a third exemplary embodiment of the method 100". The method comprises the steps 110 to 190 of the first embodiment of the method 100 of FIG. 5 and additionally a forbidden-region detection functionality 300.

This functionality allows detecting forbidden regions on the remote target, i.e. regions to which no LRF measurements must be performed.

When a measurement request is received 110, image data of the target, e.g. of a first image of the target, is received 120 and pose data of the device is received 130, i.e. for the pose of the device when capturing the first image. The image data and the pose data are stored together. Then, a forbidden region on the target is identified 310 using the image data. As described with respect to FIG. 4, such a forbidden region may be a laser warning receiver on the target or elsewhere in the field of view. Identifying 310 the forbidden region may be performed automatically by a digital processing unit of the observation device, e.g. using image recognition algorithms and a database with images of known laser warning receivers or other structures or surfaces to which measurements must be prevented. Alternatively or additionally, the user is presented the first image as a still image on a display unit of the device and identifying 310 the forbidden region comprises a manual selection of the forbidden region in the image. Also, the user may be presented the first image together with overlaid markings of suspicious regions that the digital processing unit has identified as possible forbidden regions, and the user may select or unselect the suspicious regions as forbidden regions.

The image, the respective pose and the identified 310 forbidden region are stored. Based on the image data, pose data and image position of the identified 310 forbidden region, it is possible to back-project the forbidden region and transform 320 the forbidden region to 3D data.

Based on the received pose data, a pose of the device, and thus a direction of the measurement axis of the LRF, are continuously monitored 330.

Based on said continuously monitored pose and direction, it is then automatically detected 340 when an emission axis of the LRF aims at a forbidden region. If the emission axis is within such a forbidden region, a range measurement of the LRF is automatically prevented and the method continues with continuously monitoring 330 the pose of the device. If the emission axis is not within such a forbidden region, the method continues with the remaining steps of the first embodiment of the method of FIG. 5, i.e. with triggering a range measurement (step 140), obtaining the range-measurement data (step 150), calculating 3D coordinates (step 160), determining gaps (step 170) and monitoring the pose (step 180). When in step 190 it is determined that the measurement axis aims at a gap, this does not lead to immediately triggering an additional LRF measurement, but first to determining 340, whether the measurement axis is aimed at a forbidden region.

In particular, the forbidden-region detection functionality 300 may be combined with the pose-prediction functionality 200 of the second embodiment. For instance, it may then be determined whether the measurement axis is about to aim at a forbidden region, and the LRF measurement is prevented for a point in the near future.

Figure 8:
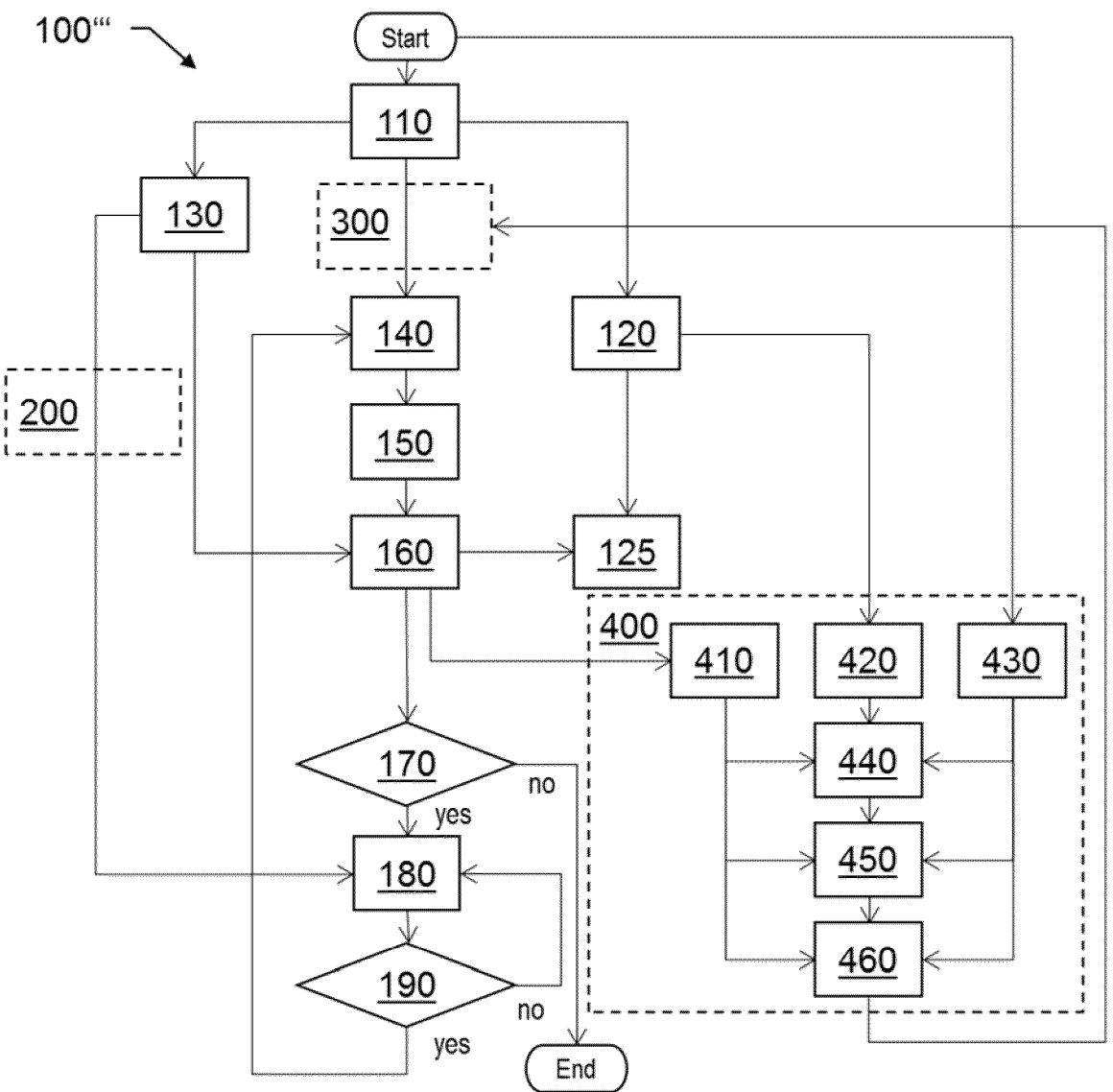
FIG. 8 shows a flow chart illustrating a fourth exemplary embodiment of a method according to the invention.

FIG. 8 illustrates a fourth exemplary embodiment of the method 100'''. The method comprises the steps 110 to 190 of the first embodiment of the method and additionally a target-recognition functionality 400. Optionally, the method 100''' also comprises the pose-prediction functionality 200 and/or the forbidden-region detection functionality 300, described with respect to FIGS. 6 and 7, respectively. The target-recognition functionality 400 relates to automatic target recognition comprising recognizing a kind and pose of the target. Optionally, also forbidden regions on the target to which regions no LRF measurements must be performed, can be recognized.

For performing this target-recognition functionality 400, 3D target point coordinates determined in step 160 are provided in a memory of the device as a point cloud and can be obtained 410 by the digital processing unit of the hand-held device. Also image data of the target received from the camera in step 120 can be used 420 by the digital processing unit. Additionally, 3D data of a plurality of different target kinds is provided in a database and can be retrieved 430 by the digital processing unit.

In a first step 440, the target kind of the remote target needs to be determined. This may involve user interaction, i.e. the user may recognize the target kind and select it from the database. This may also involve image recognition by the digital processing unit using 420 the image data of the target. Also, a complete or partial point cloud of the remote target may be obtained 410 and compared with the retrieved 3D data of known target kinds to recognize the target kind of the remote target. Optionally, also other data, such as IR image or sound data may be captured of the remote target, retrievable from the database and used for recognizing the target type. The best match or a selection of candidates may be provided to the user.

When the target is known or has been recognized, it is possible to use the point cloud and the 3D data of the plurality of different target kinds to determine 450 an actual pose of the remote target, e.g. if the target is a vehicle, for instance a military vehicle such as a tank. The determined pose can be provided to the user. If the target is moving, the determined pose may be tracked, e.g. based on the image data.

Optionally, the 3D data of the plurality of different target kinds may comprise information about the locations of regions on the targets that are forbidden for LRF measurements, e.g. comprising LRF sensors. A position of one or more of those forbidden regions at the remote target is then retrieved from the database, and, based on the continuously monitored pose, range measurements of the laser rangefinder unit to the forbidden regions are automatically prevented. In a particular embodiment, this step may be combined with the forbidden-region detection functionality 300. The identified forbidden region may then be corrected 460 using the exact pose of the target and the exact position of the forbidden region on the identified target type. The correction 460 e.g. may include adding forbidden regions (e.g. previously undetected or hidden forbidden regions), removing erroneously assumed forbidden regions, or more accurately defining the borders of the forbidden regions.

If the method comprises the forbidden-region detection functionality 300 as shown here, after the correction 460 the method may continue with this functionality, e.g. with the step of transforming 320 the forbidden region to 3D data.

Although the invention is illustrated above, partly with reference to some preferred embodiments, it must be understood that numerous modifications and combinations of different features of the embodiments can be made. All of these modifications lie within the scope of the appended claims.

The invention claimed is:

1. Hand-held observation device comprising
a laser rangefinder unit configured to measure a distance along a measurement axis between the observation device and a target point on a remote target and to generate range-measurement data;

a camera configured to capture images of the target and to generate image data;
a pose detection unit configured to detect a pose of the observation device and to generate pose data;
a display unit configured to display an image of the target based on the image data together with the range-measurement data to a user of the observation device;
a user input device configured to receive user inputs from the user; and
a digital processing unit comprising a memory, wherein the digital processing unit is configured,
to receive a measurement request from the user via the user input device,
to receive image data from the camera,
to continuously receive the pose data from the pose detection unit,
to trigger range measurements to one or more target points using the laser rangefinder unit,
to receive range-measurement data from the laser rangefinder unit,
to calculate, based on the pose data and on the range measurement data, 3D target point coordinates for the one or more target points, and
to store the 3D target point coordinates in the memory,
wherein the digital processing unit is further configured:
to compare the stored 3D target point coordinates with the measurement request to determine one or more regions with missing 3D target points coordinates,
to continuously monitor the pose of the observation device based on the continuously received pose data,
to detect, based on the continuously monitored pose, when the measurement axis of the laser rangefinder unit aims at one of the determined regions with missing 3D target point coordinates, and
to automatically trigger an additional range measurement of the laser rangefinder unit for measuring 3D target point coordinates in the region the measurement axis aims at.

2. Hand-held observation device according to claim 1, wherein the digital processing unit is configured
to calculate, based on the pose data, image positions for a plurality of stored 3D target point coordinates in the displayed image, and
to trigger displaying the image on the display unit with overlaid markers at the image positions, wherein:
the images captured by the camera are an image stream, and the images displayed on the display unit are live images;
the 3D target point coordinates are stored in the memory together with pose data relating to a pose of the hand-held observation device at the time of the measurement of the distance between the observation device and the respective target point; and/or
the digital processing unit is configured to trigger displaying, on the display unit, a reticle indicating a measurement axis of the laser rangefinder unit in the image and/or instructions for the user to aim the hand-held observation device to a region with missing 3D target point coordinates.

3. Hand-held observation device according to claim 1, wherein the digital processing unit is configured:
to perform a pose-prediction functionality which comprises using a dynamic model, particularly a Kalman filter, to continuously predict the pose of the observation device for a point in the near future,
to continuously monitor the predicted pose of the observation device in the near future, to determine, based on the continuously monitored predicted pose, when the measurement axis of the laser rangefinder unit is about to aim at one of the determined regions with missing 3D target points coordinates, and to automatically trigger an additional range measurement of the laser rangefinder unit for measuring, at the point in the near future, 3D target point coordinates in the region the measurement axis is about to aim at.

4. Hand-held observation device according to claim 3, wherein the pose-prediction functionality comprises:

detecting and continuously monitoring, based on the received pose data, a tremor of the user's hand holding the observation device, using the dynamical model to estimate dynamic parameters of the device effected by the tremor, particularly wherein the dynamic model is optimized on hand-jitter dynamics, and predicting the pose of the observation device for the point in the near future based on the estimated dynamic parameters.

5. Hand-held observation device according to claim 3, wherein the pose-prediction functionality comprises using an adaptive system, particularly an artificial neural network, to learn a hand movement dynamic of the user's hand holding the observation device to obtain an enhanced prediction model for the pose of the device, and predicting the pose of the observation device for the point in the near future based on the enhanced prediction model.

6. Hand-held observation device according to claim 1, wherein the remote target is a military target, particularly an armoured vehicle, and the digital processing unit is configured to perform a forbidden-region-detection functionality comprising identifying, in an image of the target and/or in the image data, a forbidden region on the target and assigning an image position to the forbidden region, determining 3D coordinates of the forbidden region based on the image data, the pose data and the image position of the forbidden region, continuously monitoring the pose of the observation device based on the continuously received pose data, and detecting, based on the continuously monitored pose, when the measurement axis of the laser rangefinder unit aims at the forbidden region, wherein a range measurement of the laser rangefinder unit to the forbidden region is automatically prevented, particularly wherein, the military target comprises laser beam detection means that are configured for detecting a laser beam emitted by the laser rangefinder unit, particularly wherein the laser beam detection means is configured to determine a position of the hand-held observation device based on the detected laser beam, and the forbidden region includes the laser beam detection means of the target.

7. Hand-held observation device according to claim 6, wherein identifying the forbidden region comprises using image recognition by the digital processing unit, and/or displaying an image of the target and receiving a user selection of an image position as the forbidden region, wherein identifying the forbidden region comprises using image recognition by the digital processing unit, displaying an image of the target overlaid with a marker for an identified forbidden region, and receiving a user selection of an image position as the forbidden region.

8. Hand-held observation device according to claim 6, wherein;

the plurality of different target kinds is or comprises a plurality of different military target kinds, particularly armoured vehicle kinds, at least a subset of the plurality of different military target kinds comprising laser beam detection means that are configured for detecting a laser beam emitted by the laser rangefinder unit, the 3D data includes a 3D position of the respective target kind's laser beam detection means, the digital processing unit is configured to analyse the point cloud to determine a pose of the target, and the determined 3D coordinates of the forbidden region are corrected based on the determined pose of the target and the 3D position of the laser beam detection means on the target kind.

9. Hand-held observation device according to claim 1, wherein:

the 3D target point coordinates are stored in the memory as a point cloud, a database with 3D data of a plurality of different target kinds is stored in the memory, and the digital processing unit is configured to analyse the point cloud to recognize the target kind of the remote target, wherein:

the digital processing unit is configured to effect display of information about the determined target kind on the display unit, analysing the point cloud comprises calculating a best match, and/or the digital processing unit is configured to analyse the point cloud to determine a pose of the determined target, and particularly to effect display of information about the pose on the display unit.

10. Computer-implemented method for obtaining a 3D point cloud of a remote object using a hand-held observation device comprising a laser rangefinder unit, particularly using a hand-held observation device according to claim 1, the method comprising receiving a measurement request from a user of the hand-held observation device via a user input device of the hand-held observation device, receiving image data of the remote target from a camera of the hand-held observation device, continuously receiving pose data of the hand-held observation device from a pose detection unit of the hand-held observation device, triggering range measurements to one or more target points on the remote target using the laser rangefinder unit of the hand-held observation device, receiving range-measurement data from the laser rangefinder unit, calculating, based on the pose data and on the range measurement data, 3D target point coordinates for the one or more target points, and storing the 3D target point coordinates in a memory unit of the hand-held observation device, comparing the stored 3D target point coordinates with the measurement request to determine one or more regions at the remote target with missing 3D target point coordinates, continuously monitoring the pose of the observation device based on the continuously received pose data, and detecting, based on the continuously monitored pose, when the measurement axis of the laser rangefinder unit aims at one of the determined regions with missing 3D target point coordinates, and automatically triggering an additional range measurement of the laser rangefinder unit for measuring 3D target point coordinates in the region the measurement axis aims at.

11. Computer-implemented method according to claim 10, comprising displaying an image of the target based on the image data, particularly as a live image stream, calculating, based on the pose data, image positions for a plurality of stored 3D target point coordinates in the displayed image, and displaying the image with the positions as overlaid target point markers, wherein the method further comprises displaying;

a reticle indicating a measurement axis of the laser rangefinder unit in the image, and/or instructions for the user to aim the hand-held observation device to a region with missing 3D target point coordinates.

12. Computer-implemented method according to claim 10, comprising using a dynamic model, particularly a Kalman filter, to continuously predict the pose of the observation device for a point in the near future, continuously monitoring the predicted pose of the observation device in the near future, determining, based on the continuously monitored predicted pose, when the measurement axis of the laser rangefinder unit is about to aim at one of the determined regions with missing 3D target points coordinates, and automatically triggering an additional range measurement of the laser rangefinder unit for measuring, at the point in the near future, 3D target point coordinates in the region the measurement axis is about to aim at, wherein:

the method comprises:

detecting and continuously monitoring, based on the received pose data, a tremor of the user's hand holding the observation device, using the dynamical model to estimate dynamic parameters of the device effected by the tremor, particularly wherein the dynamic model is optimized on hand-jitter dynamics, and predicting the pose of the observation device for the point in the near future based on the estimated dynamic parameters; or the method comprises:

using an adaptive system, particularly an artificial neural network, to learn a hand movement dynamic of the user's hand holding the observation device to obtain an enhanced prediction model for the pose of the device, and predicting the pose of the observation device for the point in the near future based on the enhanced prediction model.

13. Computer-implemented method according to claim 10, wherein the remote target is a military target, particularly an armoured vehicle, the method comprising identifying, in an image of the target and/or based on the image data, a forbidden region on the target and assigning an image position to the forbidden region, determining 3D coordinates of the forbidden region based on the image data, the pose data and the image position of the forbidden region, continuously monitoring the pose of the observation device based on the continuously received pose data, and detecting, based on the continuously monitored pose, when the measurement axis of the laser rangefinder unit aims at the forbidden region, wherein a range measurement of the laser rangefinder unit to the forbidden region is automatically prevented, wherein:

the military target comprises laser beam detection means that are configured for detecting laser beams and the forbidden region includes the laser beam detection means of the target; and/or identifying the forbidden region comprises using image recognition, and/or displaying an image of the target and receiving a user selection of an image position as the forbidden region, particularly wherein identifying the forbidden region comprises using image recognition, displaying an image of the target overlaid with a marker for an identified forbidden region, and receiving a user selection of an image position as the forbidden region.

14. Computer-implemented method according to claim 10, wherein the 3D target point coordinates are stored as a point cloud, the method comprising:

comparing the point cloud with 3D data of a plurality of different target kinds provided in a database to recognize a target kind of the remote target, and displaying information about the determined target kind together with an image of the target, wherein:

recognizing the target kind of the remote target is also based on the image data, and/or the method comprises analysing the point cloud to calculate a best match, and/or to determine a pose of the determined target.

15. Computer program product comprising program code which is stored on a machine-readable medium, or being embodied by a non-transitory electromagnetic wave comprising a program code segment, and having computer-executable instructions for performing, particularly when executed on a digital processing unit of a hand-held observation device according to claim 1.

* * * * *